(12) United States Patent
Lindig

(10) Patent No.: US 8,665,559 B2
(45) Date of Patent: Mar. 4, 2014

(54) MAGNETIC HEAD

(75) Inventor: Darin D Lindig, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/423,761

(22) Filed: Mar. 19, 2012

(65) Prior Publication Data

US 2013/0244057 A1 Sep. 19, 2013

(51) Int. Cl.
*G11B 5/012* (2006.01)

(52) U.S. Cl.
USPC .......................................................... 360/110

(58) Field of Classification Search
USPC .............. 360/110, 324, 324.1, 324.2, 324.12; 29/603.1, 603.15, 603.16; 438/703, 438/692, 697
See application file for complete search history.

(56) References Cited

U.S. PATENT DOCUMENTS

| | | | |
|---|---|---|---|
| 3,262,812 A | 7/1966 | Falk | |
| 4,941,064 A * | 7/1990 | Tottori et al. | 360/119.11 |
| 5,278,716 A * | 1/1994 | Okuda et al. | 360/125.01 |
| 5,710,683 A | 1/1998 | Sundaram | |
| 5,863,450 A | 1/1999 | Dutertre et al. | |
| 6,788,497 B1 | 9/2004 | Cates | |
| 6,879,470 B2 | 4/2005 | Johnson et al. | |
| 7,004,819 B2 * | 2/2006 | Moeggenborg et al. | 451/41 |
| 7,092,208 B2 | 8/2006 | Zou et al. | |
| 7,129,177 B2 * | 10/2006 | Tsang et al. | 438/703 |
| 7,204,014 B2 | 4/2007 | Gill et al. | |
| 7,813,086 B2 * | 10/2010 | Tanaka et al. | 360/324.1 |
| 2002/0105755 A1 * | 8/2002 | Bijker et al. | 360/122 |

FOREIGN PATENT DOCUMENTS

| | | |
|---|---|---|
| JP | 63188811 | 8/1988 |
| JP | 2000040320 | 2/2000 |

OTHER PUBLICATIONS

Diamond-like Carbon Applications in High Density Hard Disc Recording Head, Goglia, P.R. et al., Feb. 27, 2001, http//www.sciencedirect.com/science/article/pii/S0925963500005896.

* cited by examiner

*Primary Examiner* — Allen T Cao
(74) *Attorney, Agent, or Firm* — Roosevelt V. Segarra

(57) ABSTRACT

A magnetic storage and retrieval system and a manufacturing technique thereof are disclosed herein. A chemical reaction is triggered upon a surface of each metallic layer of a plurality of metallic layers disposed on a substrate. It is also determined whether a metallic material of the surface has transformed to a new metallic material that is more chemically resistant than the metallic material.

15 Claims, 4 Drawing Sheets

MAGNETIC HEAD

BACKGROUND

Computers are relied upon to record and process large volumes of data to and from nonvolatile storage media, such as magnetic discs, magnetic tape cartridges, optical disk cartridges, floppy diskettes, or optical diskettes. Typically, magnetic tape is an economical means of storing or archiving data. Storage technology is continually pushed to increase storage capacity and storage reliability. In a magnetic data storage and retrieval system, a thin film magnetic head typically includes a transducer, a substrate upon which the transducer is built, and an overcoat deposited over the transducer. The transducer, which typically includes a writer portion for recording magnetically-encoded information on a magnetic media and a reader portion for retrieving that magnetically-encoded information therefrom, is typically formed of multiple layers stacked upon the substrate.

During operation, the magnetic head is positioned in close proximity to the magnetic media. Performance of the magnetic head depends primarily upon the distance between the magnetic media and the magnetic head. The distance therebetween is small enough to allow for optimal writing and reading to and from the magnetic media.

DETAILED DESCRIPTION

As noted above, the distance between the magnetic head and the magnetic media is small enough to allow for optimal writing and reading therefrom. However, conventional magnetic head configurations suffer from pole tip recession ("PTR") in which a surface thereof is abrasively deteriorated by magnetic media passing over the surface during use. The wearing of the surface facing the magnetic media increases the distance therebetween. Such increase in distance may result in degradation of the reading and writing capabilities of the magnetic head.

In view of the foregoing, aspects of the present disclosure provide a system and manufacturing technique of a magnetic data storage and retrieval system. In one aspect, a chemical reaction may be triggered upon a surface of each metallic layer of a plurality of metallic layers disposed on a substrate. The surface may be a surface to face a magnetic media. In another aspect, it may be determined whether a metallic material of the surface has transformed to a new metallic material that is more chemically resistant than the original metallic material. In yet a further aspect, if the metallic material of the surface has transformed to the new metallic material, it may be ensured that a predetermined distance between the surface and the magnetic media is retained. The aspects, features and advantages of the application will be appreciated when considered with reference to the following description of examples and accompanying figures.

Figure 1:
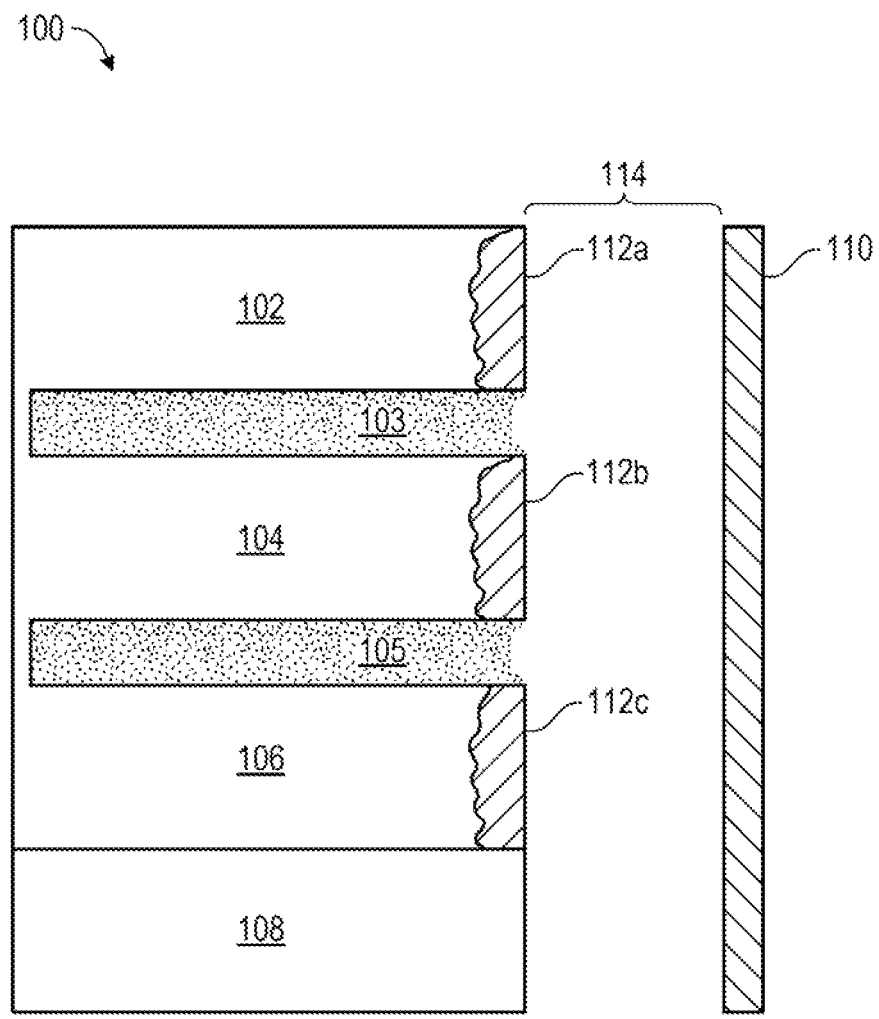
FIG. 1 depicts an illustrative magnetic head in accordance with aspects of the disclosure.

FIG. 1 is a cross-sectional view of an illustrative magnetic head 100. Magnetic head 100 is shown having a plurality of layers disposed on a substrate 108. The layers may be a write pole 102, a first magnetic noise shield 104, and a second magnetic noise shield 106. The foregoing layers may have a media-facing surface 112a-112c respectively. The media facing surfaces may face magnetic media 110 and may be positioned at a predetermined distance 114 from magnetic media 110 so as to allow optimal writing of data thereto and reading of data therefrom.

Substrate 108 may be a wafer formed of AlTiC, TiC, Si, SiC, Al2O3, or other composite materials formed of combinations of these materials. Read gap 105 may include and aluminum oxide glass or other die-electric insulator. Such insulator may protect a read element (not shown) that may be any variety of different types of read elements, such as an anisotropic magnetoresistive ("AMR") read element, a giant magnetoresistive ("GMR") read element, or a tunneling giant magnetoresistive ("TGMR") read element. In operation, magnetic flux from the surface of magnetic media 110 may cause rotation of a magnetization vector of such an MR read element, which in turn causes a change in electrical resistivity thereof. Other magnetic sensing technologies may also be used in the read element, such as Hall effect.

Write pole 102 may have a conductive coil (not shown) passing therethrough such that a flow of electrical current through the conductive coil generates a magnetic field across write gap 103, which may also include an aluminum oxide or other die-electric insulator. Write pole 102 may be formed of a magnetically soft, high magnetic saturation material, such as CoFe or Ni55Fe45 that allows write pole 102 to emit a concentrated magnetic field therefrom. First magnetic noise shield 104 and second magnetic noise shield 106 may prevent distortions in the magnetic flux proximal to write gap 103 and read gap 105 respectively. In one example, first magnetic noise shield 104 comprises CZT and second magnetic noise shield 106 comprises FeNi. However, either shield may also comprise FeTaN or FeAlN.

The media facing surfaces 112a-c may comprise a metal material that is more chemically resistant after a chemical reaction is applied on the metal material of the media facing surfaces 112a-c. Chemical resistance, as used herein, may be defined as the ability of a solid material to resist chemical changes, such as the abrasive deterioration caused by magnetic media passing over a metal. The chemically resistant metal formed on media facing surfaces 112a-c may be the product of the aforementioned chemical reaction. Examples of chemically resistant metal material may be an oxide, a nitride, or carbide. The resulting metal material may depend on the chemical reaction and the original metal of each metallic layer. Alternatively, the material may be any metal known for its strong chemical resistance.

Figure 2:
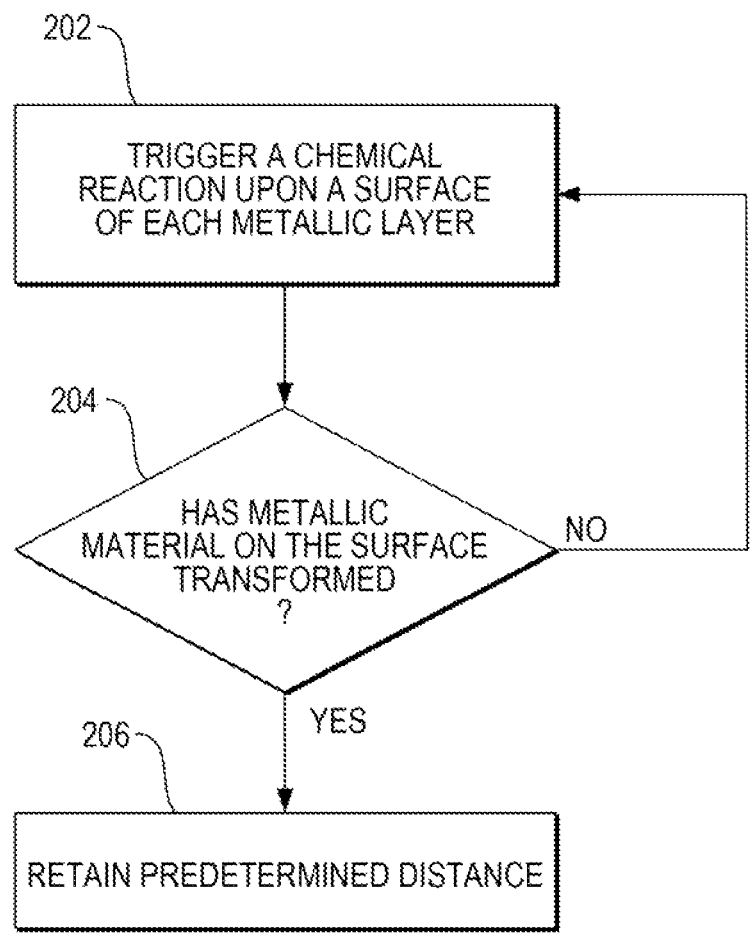
FIG. 2 is a flow diagram of an illustrative process for manufacturing a magnetic head.

One example of a method for manufacturing a wear resistant magnetic head is shown in FIGS. 2-4B. FIG. 2 is a flow diagram of an illustrative method of magnetic head manufacturing and FIGS. 3A-4B show an illustrative implementation thereof. The actions shown in FIGS. 3A-4B will be discussed below with regard to the flow diagram of FIG. 2.

Figure 3A:
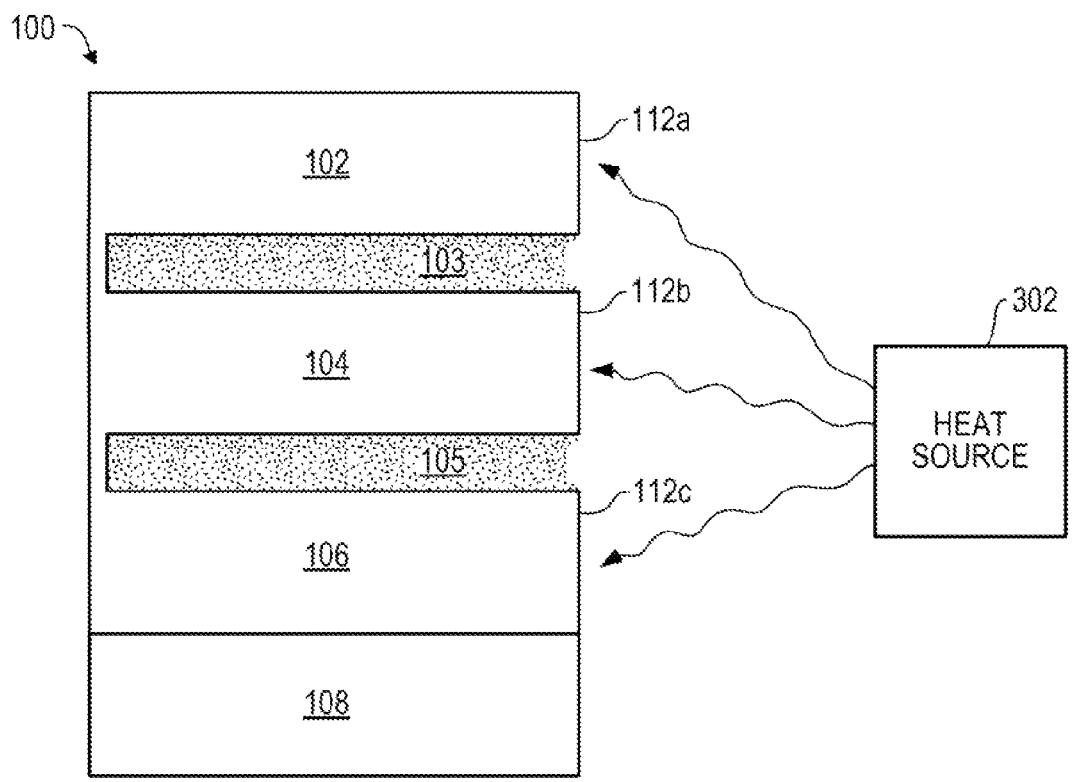
FIGS. 3A-3B show a working example of magnetic head manufacturing in accordance with aspects of the present disclosure.
Figure 3B:
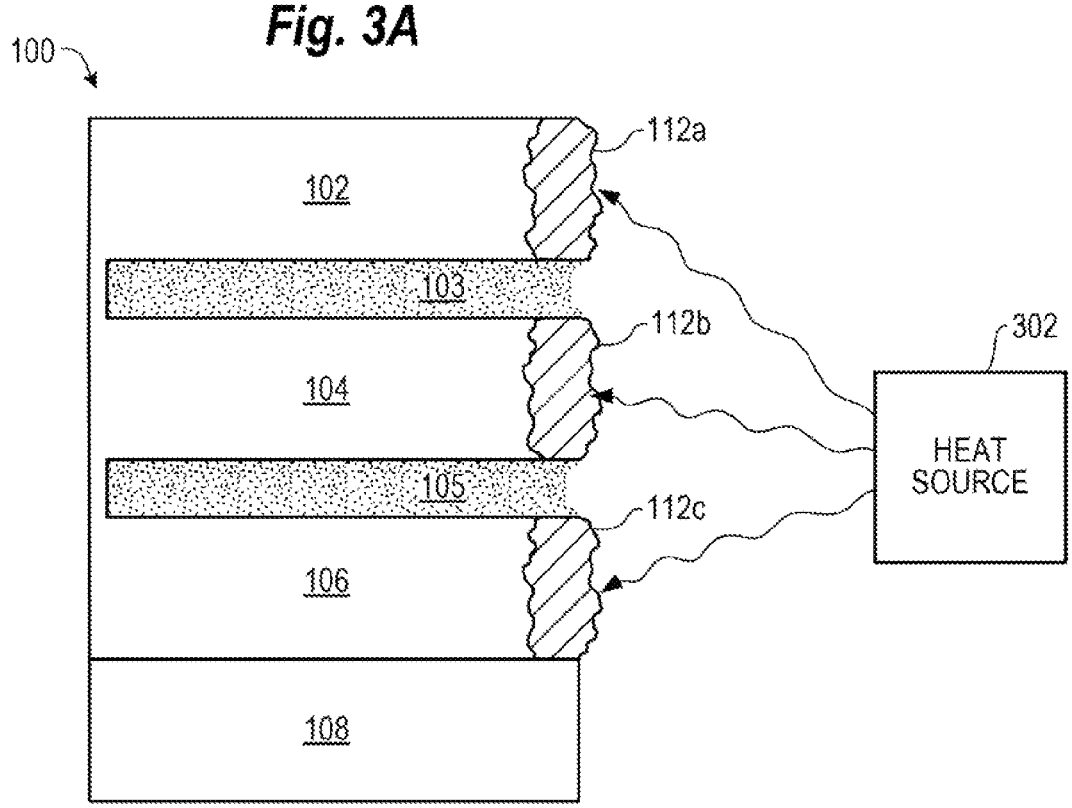

As shown in block 202, a chemical reaction may be triggered upon the surface of each metallic layer. In one example, the chemical reaction may be a change in temperature of the media-facing surfaces 112a-c. FIGS. 3A-3B are additional cross sectional views of magnetic head 100. FIG. 3A shows magnetic head 100 at the start of a chemical reaction occurring upon media-facing surfaces 112a-c. In the example of FIG. 3A, the chemical reaction is triggered by applying heat to the media-facing surfaces from heat source 302. The temperature could range from approximately 200 degrees Celsius to approximately 525 degrees Celsius. In one example, a temperature of approximately 325 degrees Celsius is applied for approximately four hours. In a further example, a temperature of approximately 525 degrees is applied for approximately 2 hours.

Returning back to FIG. 2, it may be determined whether the metallic material of the surface has transformed to a new metallic material that is more chemically resistant, as shown in block 204. The new metallic material may be the oxide, the nitride, or the carbide discussed above. In the example of FIG. 3B, write pole 102, first magnetic noise shield 104, and second magnetic noise shield 106 are shown after applying heat upon their respective media-facing surfaces 112a-c. The heat may have been applied at a predetermined temperature for a predetermined length of time. FIG. 3B depicts media-facing surfaces 112a-c transformed to a new metallic material that is more chemically resistant than the previous metallic material of each respective layer. In the example of FIG. 3B, the new metallic material is an oxide, given the metal originally included in write pole 102, first magnetic noise shield 104, and second magnetic noise shield 106, which may comprise CoFe, CZT, and FeNi respectively. Other chemical reactions and metals may generate different new metals on the surface thereof. FIG. 3B also shows media-facing surfaces 112a-c to have expanded from their original position. Such expansion can narrow distance 114 between magnetic head 100 and magnetic media 110. The narrower distance may result in magnetic head 100 touching magnetic media 110 or may result in suboptimal writing and reading of data to and from magnetic media 110.

Figure 4A:
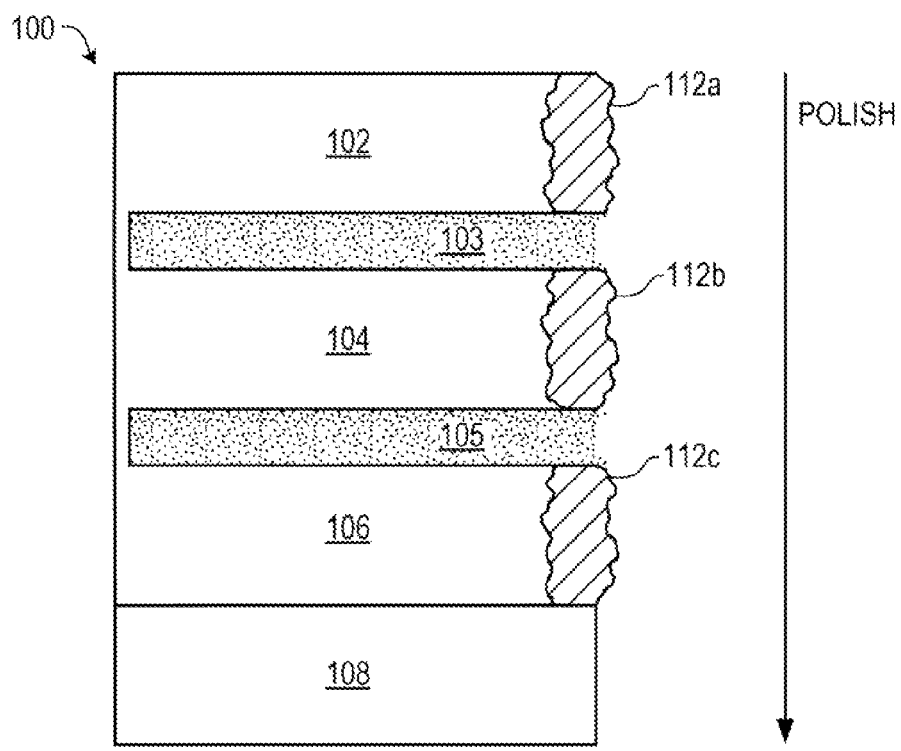
FIGS. 4A-4B show a further working example of magnetic head manufacturing in accordance with aspects of the present disclosure.
Figure 4B:
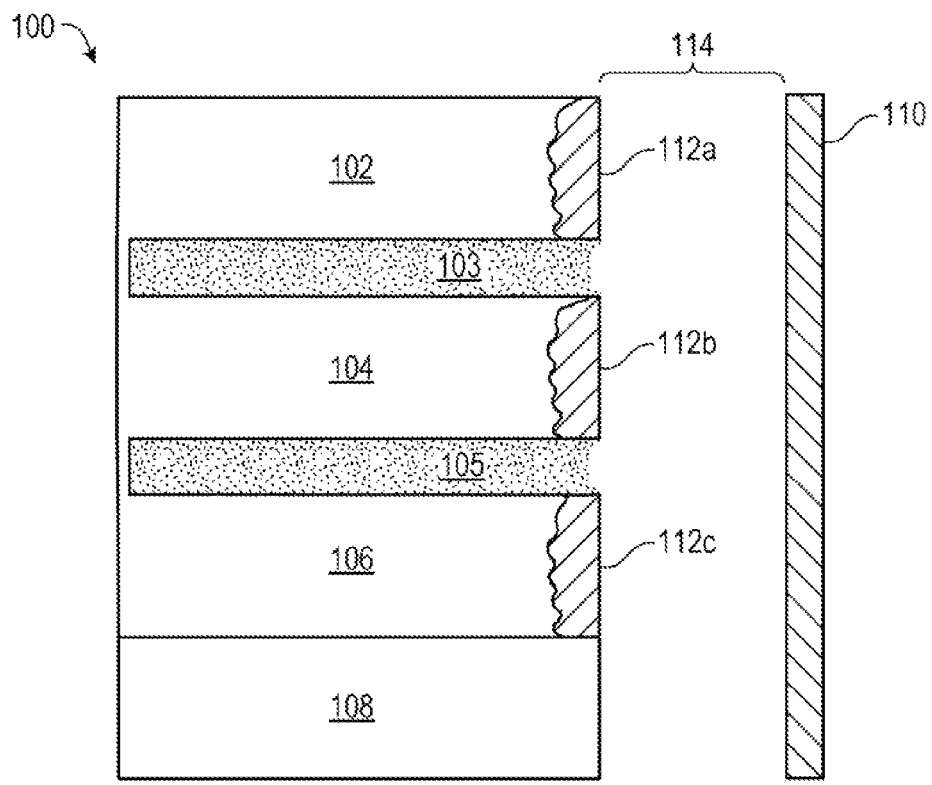

Referring back to FIG. 2, If it is determined that the metallic material has transformed into a new metallic material, it may be ensured that predetermined distance 114 has been retained, as shown in block 206. If it is determined that the metallic material has not transformed into a new metallic material, the chemical reaction may continue. Ensuring that the predetermined distance 114 has been retained may include polishing the media-facing surfaces as shown in FIG. 4A. Polishing media-facing surfaces 112a-c may retain the distance between the media-facing surfaces and the magnetic media as it was before the chemical reaction. FIG. 4B illustrates media facing surfaces 112a-c after polishing and shows the conservation of distance 114 between magnetic head 100 and magnetic media 110.

In another example, the chemical reaction disclosed above may be triggered using wet chemistry. A wet chemistry approach may be carried out by applying a liquid chemical on the media-facing surfaces 112a-c. Application of such liquids may trigger a chemical reaction that will transform the surface of the layers into a more chemically resistant metallic material. Alternatively, the chemical reaction may be an electrochemical reaction. In one example, the electrochemical reaction may include adjusting the electrical potential of media facing surfaces 112-a-c and applying an electrolyte solution thereon. This example may also induce the generation of a more chemically resistant metal on the media facing surfaces.

Advantageously, the above-described system and method provide a magnetic head that withstands PTR caused by a magnetic media passing thereover during use. In addition, the distance between the magnetic head and the media is maintained small enough to allow for optimal writing to and reading from the magnetic media and great enough to prevent contact therebetween. In this regard, performance of the magnetic head disclosed herein can be maintained longer than conventional magnetic heads.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the application as defined by the appended claims. Furthermore, while particular processes are shown in a specific order in the appended drawings, such processes are not limited to any particular order unless such order is expressly set forth herein. Rather, processes may be performed in a different order or concurrently, and steps may be added or omitted.

The invention claimed is:

1. A magnetic data storage and retrieval system comprising:
 a magnetic head having a substrate and a plurality of layers formed thereupon, each layer having a surface facing a magnetic media, the media facing surface of each layer being formed of a metal material that is more resistant to chemical deterioration after an application of heat is applied at a predetermined temperature to the media facing surface of each layer.

2. The magnetic data storage and retrieval system of claim 1, wherein the predetermined temperature is approximately 350 degrees Celsius.

3. The magnetic data storage and retrieval system of claim 2, wherein the predetermined temperature is applied to the magnetic head for approximately four hours.

4. The magnetic data storage and retrieval system of claim 1 wherein the predetermined temperature is approximately 525 degrees Celsius.

5. The magnetic data storage and retrieval system of claim 4, wherein the predetermined temperature is applied to the magnetic head for approximately two hours.

6. The magnetic data storage and retrieval system of claim 1, wherein the metal material is selected from the group consisting of an oxide, a nitride, and carbide.

7. A magnetic head, comprising: a substrate and a plurality of layers formed thereupon, each layer having a surface facing a magnetic media, the media facing surface being generated by a chemical reaction applied on the media facing surface such that the media facing surface is more resistant to chemical deterioration after the chemical reaction is applied on the media facing surface.

8. The magnetic head of claim 7, wherein the chemical reaction comprises an application of heat upon the media facing surface at a predetermined temperature.

9. The magnetic head of claim 8, wherein the predetermined temperature is approximately 350 degrees Celsius.

10. The magnetic head of claim 9, wherein the predetermined temperature is applied to the media facing surface for approximately four hours.

11. The magnetic head of claim 8, wherein the predetermined temperature is approximately 525 degrees Celsius.

12. The magnetic head of claim 11, wherein the predetermined temperature is applied to the media facing surface for approximately two hours.

13. The magnetic head of claim 7, wherein the metal material is selected from the group consisting of an oxide, a nitride, and carbide.

14. The magnetic head of claim 7, wherein the media facing surface has an electrical potential, the chemical reaction being triggered with an electrolyte solution applied thereon.

15. The magnetic head of claim 7, wherein the chemical reaction is triggered with a liquid chemical applied on the surface.

* * * * *